(12) United States Patent
Maier

(10) Patent No.: US 8,586,258 B2
(45) Date of Patent: Nov. 19, 2013

(54) HYDROGEN/GAS PRESSURE CONTROLLED HIGH PRESSURE TANK VALVES ARCHITECTURE

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 392 days.

(21) Appl. No.: 12/875,279

(22) Filed: Sep. 3, 2010

(65) Prior Publication Data

US 2012/0058409 A1 Mar. 8, 2012

(51) Int. Cl.
*H01M 8/04* (2006.01)

(52) U.S. Cl.
USPC ........... 429/444; 429/443; 429/507; 429/508; 429/512

(58) Field of Classification Search
USPC .......................... 429/443, 444, 507, 508, 512
See application file for complete search history.

(56) References Cited

U.S. PATENT DOCUMENTS

| 2008/0199746 A1* | 8/2008 | Kobayashi et al. | 429/25 |
| 2009/0032749 A1* | 2/2009 | Ishihara | 251/73 |

FOREIGN PATENT DOCUMENTS

| CN | 101395417 A | 3/2009 |
| DE | 921008 C | 12/1954 |
| DE | 202006018092 U1 | 4/2008 |
| EP | 1114957 A1 | 7/2001 |

* cited by examiner

*Primary Examiner* — Jane Rhee
(74) *Attorney, Agent, or Firm* — Fraser Clemens Martin Miller LLC; J. Douglas Miller

(57) ABSTRACT

A valve for a pressure vessel system includes a housing including a cavity and a hollow fluid flow portion. A membrane actuator is disposed in the cavity of the housing. A piston is disposed in the cavity and in the hollow fluid flow portion of the housing. A spring is disposed in the hollow fluid flow portion of the housing. The spring biases a piston head toward a fluid flow port formed in the hollow fluid flow portion. The piston head seals the fluid flow port when the biasing of the piston head by the spring is not countered by an opposite deflection of the membrane actuator.

17 Claims, 2 Drawing Sheets

HYDROGEN/GAS PRESSURE CONTROLLED HIGH PRESSURE TANK VALVES ARCHITECTURE

FIELD OF THE INVENTION

The present disclosure relates to high-pressure storage vessel systems and more particularly to high-pressure storage vessel systems for fuel cell-powered vehicles.

BACKGROUND OF THE INVENTION

Fuel cell power systems have been proposed as a clean, efficient and environmentally responsible power source for electric vehicles and various other applications. One type of fuel cell power system employs use of a proton exchange membrane (PEM) to catalytically facilitate reaction of fuels (such as hydrogen) and oxidants (such as air or oxygen) into electricity. Typically, the fuel cell power system has more than one fuel cell that includes an anode and a cathode with the PEM therebetween. The anode receives the hydrogen gas and the cathode receives the oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a byproduct. The electrons from the anode cannot pass through the PEM, and are instead directed through a load to perform work before being sent to the cathode. The work acts to operate the vehicle. Many fuel cells are combined in a fuel cell stack to generate the desired power.

The fuel cell power system can include a high pressure vessel or container for storing hydrogen gas for the fuel cell stack. The high pressure vessel can be charged with hydrogen gas at a filling station and the like. The hydrogen gas is transferred from the filling station to the high-pressure vessel on the vehicle to supply the hydrogen gas to the fuel cell stack as needed.

High-pressure vessels generally require shutoff valves for serviceability and to minimize hydrogen gas release to the ambient atmosphere. Typically, the shutoff valves are electrically-operated solenoid valves. Solenoid valves sufficient for use as shutoff valves need a high electrical current to operate, typically up to about 20 watts/piece. The high current increases fuel consumption and controller costs associated with the high-pressure vessels.

There is a continuing need for a pressure vessel system having an architecture that minimizes the use of electrically-operated solenoid valves.

SUMMARY OF THE INVENTION

In concordance with the instant disclosure, a pressure vessel system having an architecture that minimizes the use of electrically-operated solenoid valves is surprisingly discovered.

In a first embodiment, a valve for a pressure vessel system includes a housing including a cavity and a hollow fluid flow portion. A membrane actuator is disposed in the cavity of the housing. A piston is disposed in the cavity and in the hollow fluid flow portion of the housing. A spring is disposed in the hollow fluid flow portion of the housing. The spring biases a piston head toward a fluid flow port formed in the hollow fluid flow portion. The piston head seals the fluid flow port until the sealed fluid flow port is opened by a pressurization of the cavity.

In another embodiment, a pressure vessel system includes at least one high-pressure vessel in fluid communication with the valve.

In a further embodiment, a fuel cell system includes a fuel cell stack and the at least one high-pressure vessel with the valve disposed therebetween.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
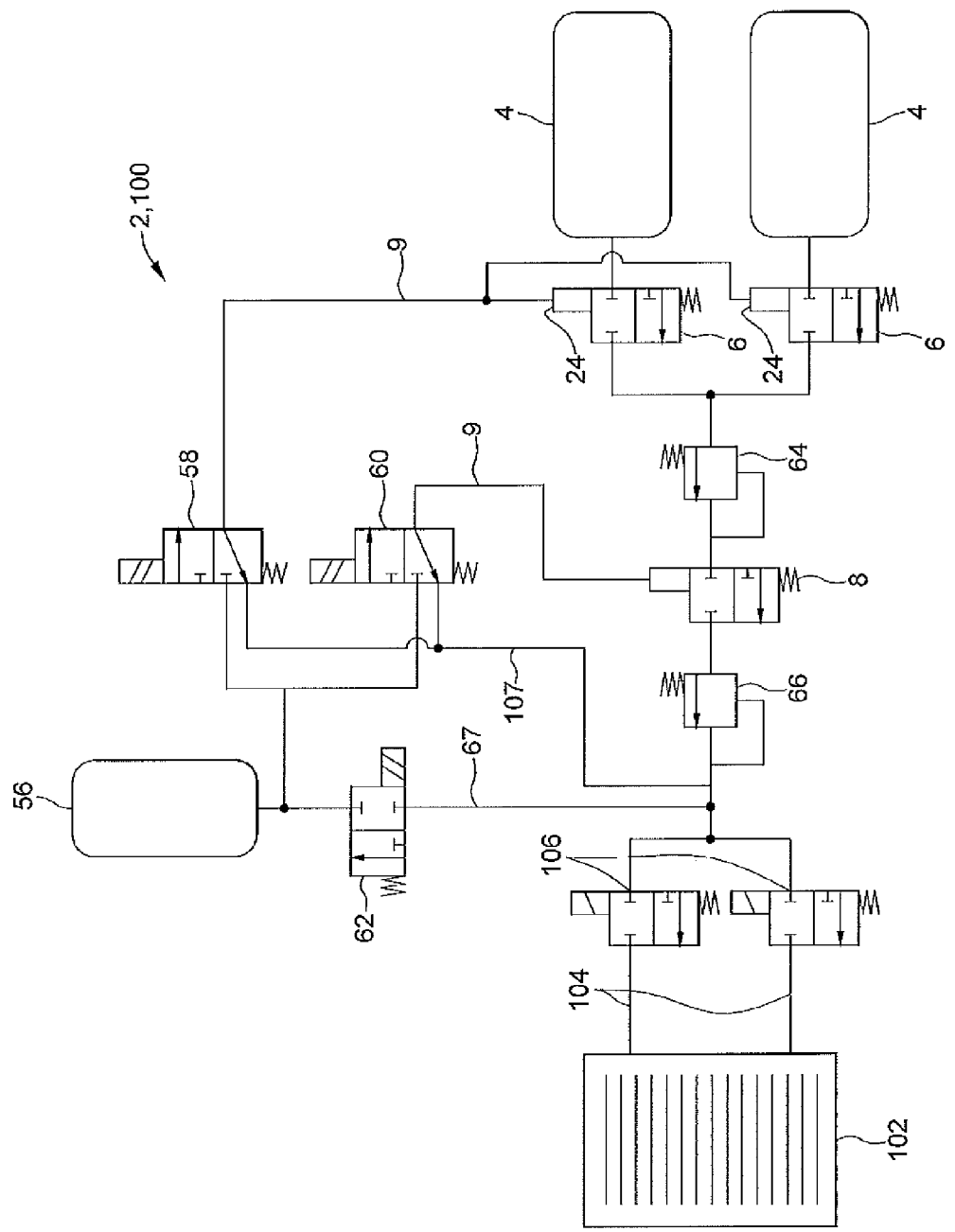
FIG. 1 is a schematic diagram of a pressure vessel system according to an embodiment of the present disclosure.

FIG. 1 illustrates a pressure vessel system 2 according to one embodiment of the present disclosure. The pressure vessel system 2 includes at least one pressure vessel 4. The at least one pressure vessel 4 may be a high-pressure hydrogen tank, for example. The at least one pressure vessel 4 is in fluid communication with at least one shutoff valve 6, 8. The at least one shutoff valve 6, 8 is in fluid communication with a control pressure line 9. The at least one shutoff valve 6, 8 is not operated by a solenoid, but is instead controlled pneumatically via the control pressure line 9 to selectively permit fluid flow, e.g., hydrogen flow, from the at least one pressure vessel 4. In particular, the at least one shutoff valve 6, 8 is pneumatically controlled through use of an "over-pressure" of the at least one pressure vessel 4, defined further herein, and which is readily available in the pressure vessel system 2.

Figure 2:
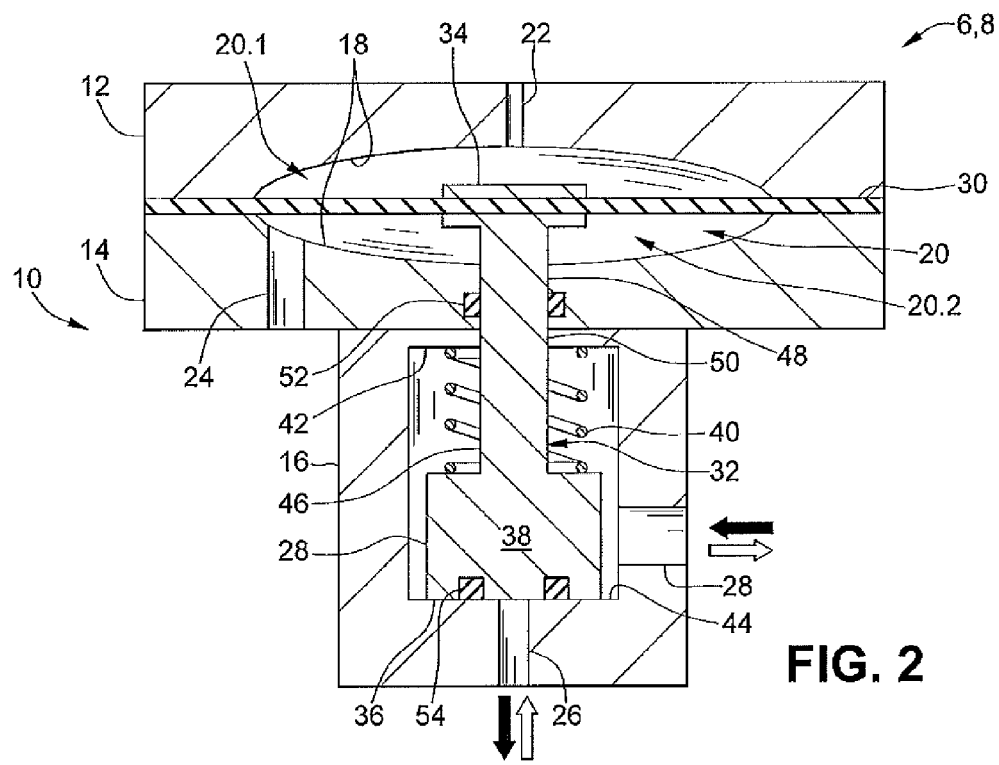
FIG. 2 is a cross-sectional side elevational view of a hydrogen/gas pressure-controlled high-pressure tank valve according to an embodiment of the present disclosure, the valve shown in the closed position.
Figure 3:
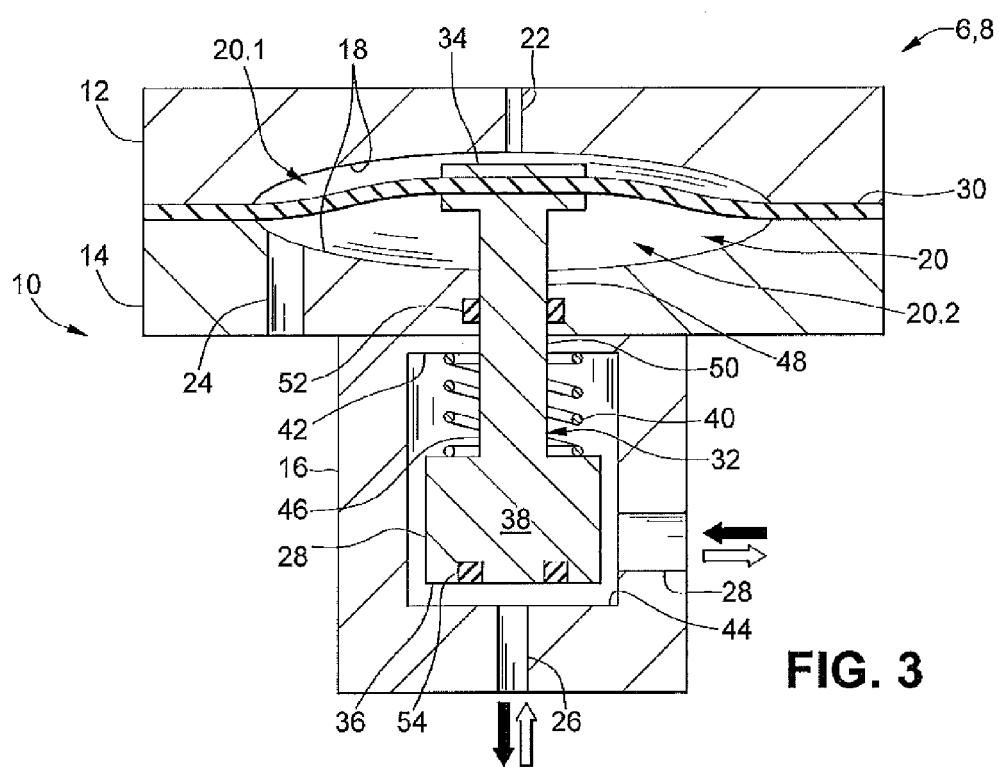
FIG. 3 is a cross-sectional side elevational view of the hydrogen/gas pressure-controlled high-pressure tank valve depicted in FIG. 2, the valve shown in the open position.

The at least one shutoff valve 6, 8 is illustrated in FIGS. 2 and 3. The at least one shutoff valve 6, 8 includes a housing 10 having an upper body portion 12, a lower body portion 14, and a hollow fluid flow portion 16. The upper body portion 12 is coupled to the lower body portion 14. The lower body portion 14 is coupled to the hollow fluid flow portion 16. The upper body portion 12 and the lower body portion 14 have contoured surfaces 18. The contoured surfaces 18 cooperate to form a cavity 20 between the upper body portion 12 and the lower body portion 14.

The upper body portion 12 has a ventilation port 22 formed therein. The lower body portion 14 has a pressure control port 24 formed therein. Each of the ventilation port 22 and the pressure control port 24 is in fluid communication with the cavity 20. The pressure control port 24 is in fluid communication with a fluid reservoir 56 (shown in FIG. 1). The ventilation port 22 is open to an atmosphere. The hollow fluid flow portion 16 of the housing 10 has a pair of fluid flow ports 26, 28 formed therein. The at least one pressure vessel 4 is in fluid communication with one of the fluid flow ports 28.

A membrane actuator 30 is disposed between the upper body portion 12 and the lower body portion 14 of the housing 10. The membrane actuator 30 forms a substantially fluid-tight barrier that divides the cavity 20 into an upper section 20.1 and a lower section 20.2. The membrane actuator 30 is configured to deform in response to an increase in pressure in the lower section 20.2 of the cavity 20, for example, due to the introduction of high-pressure fluid flow through the pressure control port 24 in the lower body portion 14 of the housing 10. A profile of the contoured surfaces 18 may be selected as a function of the deformation of the membrane actuator 30.

When the membrane actuator 30 deforms under pressure, a volume of fluid such as air in the upper section 20.1 of the cavity 20 is freely expelled through the ventilation port 22. The ventilation port 22 thereby minimizes a resistance to deformation of the membrane actuator 30. The membrane actuator 30 is a thin sheet of deformable material. The membrane actuator 30 may be formed from a metal, a polymer, or a flexible composite material, as nonlimiting examples. A skilled artisan should appreciate that the membrane actuator 30 may be formed from any sufficiently deformable and substantially fluid impervious material, as desired.

A piston 32 is disposed in the cavity 20 and in the hollow fluid flow portion 16 of the housing 10. The piston 32 has a first end 34 and a second end 36. The piston 32 is coupled at the first end 34 to the membrane actuator 30 in the cavity 20. The second end 36 of the piston 32 has a piston head 38. The piston head 38 is disposed in the hollow fluid flow portion 16 of the housing 10.

A spring 40 is also disposed in the hollow fluid flow portion 16 of the housing 10. The spring 40 is disposed between and abuts a first inner wall 42 of the hollow fluid flow portion 16 and the piston head 38. The spring 40 biases the piston head 38 toward the fluid flow port 26 formed in the hollow fluid flow portion 16. The piston head 38 abuts a second inner wall 44 of the hollow fluid flow portion 16, and seals the fluid flow port 26 when the biasing of the piston head 38 by the spring 40 is not countered by an opposite deflection of the membrane actuator 30. The shutoff valve 6, 8 may thereby be operated between a closed position (shown in FIG. 2) and an open position (shown in FIG. 3), depending upon the pressure within the lower section 20.2 of the cavity 20 formed between the upper body portion 12 and the lower body portion 14 of the housing 10. It should be appreciated that the shutoff valve 6, 8 does not exhibit proportional behavior, and is merely operable between the open position and the closed position as shown. It should also be appreciated that the at least one shutoff valve 6, 8 may operate bidirectionally, with fluid flowing to or from the pressure vessel 4 when the at least one shutoff valve 6, 8 is in the open position, depending on the pressure differential between the fluid flow ports 26, 28.

In particular embodiments, the piston 32 includes a stem 46 disposed between the first end 34 and the second end 36 of the piston 32. The spring 40 may surround the stem 46 of the piston 32 inside the hollow fluid flow portion 16 of the housing 10. The stem 46 is disposed through a pair of apertures 48, 50 formed in the lower body portion 14 and the hollow fluid flow portion 16 of the housing 10, respectively. A ring seal 52 may be disposed in one of the pair of apertures 48, 50. The ring seal 52 permits the stem 46 of the piston 32 to move through the apertures 48, 50, while militating against fluid flow from the cavity 20 to the hollow fluid flow portion 16 of the housing 10. The ring seal 52 may be an elastomeric O-ring, for example. Other suitable shapes and materials for the ring seal 52 may also be employed, as desired.

The piston head 38 may also have a seal 54 disposed thereon. The seal 54 may be elastomeric and configured to selectively seal the piston head 38 against the second inner surface 44 of the hollow fluid flow portion 16 of the housing 10. The seal 54 may be a ring seal such as an O-ring, for example, and surrounds the fluid flow port 26 when the piston head 38 abuts the second inner surface 44 of the hollow fluid flow portion 16 of the housing 10.

With renewed reference to FIG. 1, the pressure control port 24 of the shutoff valve 6, 8 is in selective fluid communication with the fluid reservoir 56 via the control pressure line 9. The fluid reservoir 56 contains an amount of pressurized fluid, such as pressurized hydrogen, sufficient to ensure a consistent operation of the at least one shutoff valve 6, 8 that is independent of pressure variation within the at least one pressure vessel 4. The fluid reservoir 56 has a volume less than a volume of the at least one pressure vessel 4. In one example, the particular volume of the fluid reservoir 56 may be a factor of at least 100 less than the volume of the at least one pressure vessel 4, more particularly a factor of at least 200 less than the volume of the at least one pressure vessel 4, and most particularly a factor of at least 300 less than the volume of the at least one pressure vessel 4. Suitable volumes for the fluid reservoir 56 and the at least one pressure vessel 4 may be selected, as desired.

In an alternative embodiment, the at least one shutoff valve 6, 8 can be actuated by compressed air from a compressed air reservoir (not shown). The compressed air reservoir is charged, for example, via an air compressor (not shown).

The pressure vessel system 2 further includes at least one first electrically-controlled pneumatic valve 58, 60. The at least one first electrically-controlled pneumatic valve 58, 60 is disposed between, and in fluid communication with, the fluid reservoir 56 and the pressure control port 24 of the at least one shutoff valve 6, 8. The first electrically-controlled pneumatic valve 58, 60 selectively controls fluid flow to the at least one shutoff valve 6, 8 for operation of the at least one shutoff valve 6, 8.

The fluid reservoir 56 of the pressure vessel system 2 is in fluid communication with the fluid flow port 26 of the shutoff valve 6, 8. The "over pressure" or "over pressure energy" of the at least one pressure vessel 4 is employed to charge the fluid reservoir 56. A skilled artisan should appreciate that the pressure inside of the pressure vessel 4 is always higher than the ambient atmospheric pressure of about 1 bar. As nonlimiting examples, the maximum pressure of the higher pressure vessel 4 may be about 700 bar, and the minimum pressure may be about 20 bar. Over-pressure energy is stored in the compressed, high-pressure fluid inside the pressure vessel 4, as determined by the equation:

$$\text{Over Pressure Energy} = \text{Volume} \times \text{Pressure Difference}$$

The pressure vessel system 2 may also include a second electrically-controlled pneumatic valve 62 disposed between, and in fluid communication with, the fluid reservoir 56 and the fluid flow port 26 of the shutoff valve 6, 8. The second electrically-controlled pneumatic valve 62 selectively controls fluid flow to the fluid reservoir 56 from the pressure vessel 4 for maintaining the desired pressure in the fluid reservoir 56. The fluid reservoir 56 is thereby maintained at a desired pressure for operating the shutoff valve 6, 8 by the at least one pressure vessel 4.

It should be appreciated that the first and second electrically-controlled pneumatic valves 58, 60, 62 of the present disclosure have a lower electrical load than typical solenoid-operated shut-off valves. Few power electronics are disposed inside of the inside the first and second electrically controlled pneumatic valves 58, 60, 62, and smaller wiring harnesses are used. There is also less electromagnetic compatibility (EMC)

sensitivity associated with the first and second electrically-controlled pneumatic valves 58, 60, 62, which is caused by the lower electrical current and smaller valve solenoids compared to conventional solenoid-operated shutoff valves.

In a particular embodiment, the at least one pressure vessel 4 in the pressure vessel system 2 of the present disclosure includes a pair of the pressure vessels 4. Additionally, the at least one shutoff valve 6, 8 includes a pair of first shutoff valves 6 and a second shutoff valve 8. Each of the first shutoff valves 6 is in fluid communication with one of the pressure vessels 4. The second shutoff valve 8 is in fluid communication with each of the first shutoff valves 6. A first pressure regulator 64 may be disposed between, and in fluid communication with, the first shutoff valve 6 and the second shutoff valve 8. A second pressure regulator 66 is disposed between, and in fluid communication with, the second shutoff valve 8 and a branch line 67 to the second electrically-controlled pneumatic valve 62.

It should be appreciated that the over-pressure energy in the pressure vessels 4 operates the shutoff valves 6, 8 in the pressure vessel system 2 of the present disclosure. The fluid reservoir 56 is employed for fail-safe operations and independency to pressure variations. A small reservoir volume, as described hereinabove, is sufficient for this purpose. The fluid reservoir 56 is in communication with the shutoff valves 6, 8 that are normally closed.

One of ordinary skill in the art should understand that the first shutoff valves 6, which are in direct fluid communication with the pressure vessels 4, experience an inlet pressure based upon a full pressure of the pressure vessels 4 (e.g., between about 20 bars and about 700 bars) at the fluid flow port 26. The inlet pressure of the second shutoff valve 8 is instead dependent upon an operational pressure of the first pressure regulator 64, as a nonlimiting example, from about 20 bars to about 30 bars. Other inlet pressures and operational pressures may be selected, as desired.

With further reference to FIG. 1, the present disclosure includes a fuel cell system 100 having the pressure vessel system 2. The fuel cell system 100 includes a fuel cell stack 102 having a plurality of fuel cells arranged in a stack. The fuel cell stack 102 has at least one anode inlet 104 for delivery of hydrogen to the anodes of the fuel cells in the fuel cell stack 102. The at least one anode inlet 104 is in fluid communication with at least one anode injector 106. The at least one anode injector 106 is in fluid communication with the at least one shutoff valve 6, 8 and the at least one pressure vessel 4 of the pressure vessel system 2.

In a particular embodiment, the pressure control port 24 of the at least one shutoff valve 6, 8 is in selective fluid communication with the fluid reservoir 56. The at least one first electrically-controlled pneumatic valve 58, 60 is disposed between, and in fluid communication with, the fluid reservoir 56 and the pressure control port 24 of the shutoff valve 6, 8. The first electrically-controlled pneumatic valve 58, 60 selectively controls the fluid flow to the shutoff valve 6, 8 for operation of the shutoff valve 6, 8. The fuel cell system 100 further includes a waste line 107 in fluid communication with the at least one first electrically-controlled pneumatic valve 58, 60. The waste line 107 is in fluid communication with the anode inlet 104 of the fuel cell stack 102, and configured to minimize hydrogen losses within the fuel cell system 100. Alternatively, the waste line 107 may be connected to an anode exhaust (not shown) or a cathode exhaust (not shown), depending on pressure differences and the overall system design, for example.

The pressure range at the anode injector 106 inlet may be from about 5 bars to about 8 bars, as a nonlimiting example.

The pressure at the anode injector 106 is regulated by the second pressure regulator 66. This also may be the pressure range for the pneumatic valves 58, 60, 62. The inlet pressure of the second pressure regulator 66 is controlled by the first pressure regulator 64. The setpoint of the first pressure regulator 64 may be between about 20 bars and about 30 bars, as a nonlimiting example. If the pressure of the vessel 4 pressure is below about 30 bars, it should be understood that the first pressure regulator 64 at the setpoint between about 20 bars and about 30 bars does not further reduce the pressure and operates in a feed through manner.

Alternatively, in place of a fuel cell stack 102, the pressure vessel system 2 of the present disclosure may be employed with an internal combustion engine (not shown).

Advantageously, there is no electrical power or current employed to actuate the shutoff valves 6, 8 in the pressure vessel system 2 and the fuel cell system 100 of the present disclosure. Through use of the over-pressure at the pressure vessels 4, less electrical power is needed in comparison to the state-of-the-art pressure vessel systems 2, which results in increased system efficiency. For example, solenoid valves typically require about 20 watts/piece, and the electrically-controlled pneumatic valves 58, 60, 62 used to operate the shutoff valves 6, 8 of present disclosure generally require about 1 watt/piece. Thus, it should be appreciated that the pressure vessel system 2 is desirably low voltage, and can be advantageously downsized in terms of overall cost and weight.

While certain representative embodiments and details have been shown for purposes of illustrating the invention, it will be apparent to those skilled in the art that various changes may be made without departing from the scope of the disclosure, which is further described in the following appended claims.

What is claimed is:

1. A valve for a pressure vessel system, comprising:
   a housing including a cavity and a hollow fluid flow portion, the housing having a ventilation port and a pressure control port formed therein in fluid communication with the cavity and a pair of fluid flow ports formed in the hollow fluid flow portion; wherein the cavity is not in fluid communication with the hollow fluid flow portion during operation of the valve;
   a membrane actuator disposed in the cavity of the housing, the membrane actuator forming a substantially fluid-tight barrier that divides the cavity;
   a piston disposed in the cavity and the hollow fluid flow portion of the housing, the piston having a first end and a second end, the piston coupled at the first end to the membrane actuator in the cavity, and the second end having a piston head disposed in the hollow fluid flow portion; and
   a spring disposed in the hollow fluid flow portion of the housing, the spring biasing the piston head toward one of the fluid flow ports formed in the hollow fluid flow portion to seal the one of the fluid flow ports, wherein the sealed one of the fluid flow ports formed in the hollow fluid flow portion is opened by a pressurization of the cavity.

2. The valve of claim 1, wherein the housing includes an upper body portion and a lower body portion, the upper body portion coupled to the lower body portion and the lower body portion coupled to the hollow fluid flow portion, the upper body portion and the lower body portion having contoured surfaces that cooperate to form the cavity between the upper body portion and the lower body portion, wherein the ventilation port is formed in the upper body portion, wherein the pressure control port is formed in the lower body portion, wherein the membrane is disposed between the upper body portion and the lower body portion, wherein the spring abuts a first inner wall of the hollow fluid flow portion, wherein the piston head abuts a second inner wall of the hollow fluid flow portion when the biasing of the piston head by the spring is not countered by an opposite deflection of the membrane actuator, and wherein the pressurization of the cavity causes the opposite deflection of the membrane actuator.

3. The valve of claim 2, wherein the piston includes a stem disposed between the first end and the second end of the piston, the stem extending through a pair of apertures formed in the lower body portion and the hollow fluid flow portion of the housing.

4. The valve of claim 3, wherein the spring surrounds the stem of the piston inside of the hollow fluid flow portion of the housing.

5. The valve of claim 2, wherein the piston head has a seal formed thereon for sealing the one of the fluid flow ports when the piston head abuts the second inner wall of the hollow fluid flow portion.

6. The valve of claim 1, wherein the membrane actuator divides the cavity into a lower cavity and an upper cavity.

7. The valve of claim 6, wherein the pressure control port is in fluid communication with the lower cavity, and the ventilation portion is in fluid communication with the upper cavity.

8. A pressure vessel system, comprising:
at least one high-pressure vessel in fluid communication with at least one shutoff valve, the shutoff valve comprising a housing including a cavity and a hollow fluid flow portion, the housing having a ventilation port and a pressure control port formed therein, the pressure control port of the shutoff valve in selective fluid communication with a fluid reservoir, and a pair of fluid flow ports formed in the hollow fluid flow portion, a membrane actuator disposed in the cavity of the housing, the membrane actuator forming a substantially fluid-tight barrier that divides the cavity, a piston disposed in the cavity and the hollow fluid flow portion of the housing, the piston having a first end and a second end, the piston coupled at the first end to the membrane actuator in the cavity, and the second end having a piston head disposed in the hollow fluid flow portion, and a spring disposed in the hollow fluid flow portion of the housing, the spring biasing the piston head toward one of the fluid flow ports formed in the hollow fluid flow portion to seal the one of the fluid flow ports, wherein the sealed one of the fluid flow ports formed in the hollow fluid flow portion is opened by a pressurization of the cavity, and wherein at least one first electrically-controlled pneumatic valve is disposed between, and in fluid communication with, the fluid reservoir and the pressure control port of the shutoff valve, the first electrically-controlled pneumatic valve selectively controlling fluid flow to the shutoff valve for operation of the shutoff valve.

9. The pressure vessel system of claim 8, wherein the fluid reservoir is in fluid communication with one of the fluid flow ports of the shutoff valve, the fluid reservoir thereby maintained at a desired pressure by the at least one high-pressure vessel for operating the shutoff valve.

10. The pressure vessel system of claim 9, wherein a second electrically-controlled pneumatic valve is disposed between, and in fluid communication with, the fluid reservoir and one of the fluid flow ports of the shutoff valve, the second electrically-controlled pneumatic valve selectively controlling fluid flow to the fluid reservoir for maintaining the desired pressure in the fluid reservoir.

11. The pressure vessel system of claim 10, wherein the at least one high-pressure vessel includes a pair of high-pressure vessels, and the at least one shutoff valve includes a pair of first shutoff valves, each of the first shutoff valves in fluid communication with one of the high-pressure vessels, and a second shutoff valve in fluid communication with each of the first shutoff valves.

12. The pressure vessel system of claim 11, wherein a first pressure regulator is disposed between, and in fluid communication with, the first shutoff valves and the second shutoff valve.

13. The pressure vessel system of claim 12, wherein a second pressure regulator is disposed between, and in fluid communication with, the second shutoff valve and a branch line to the second electrically-controlled pneumatic valve.

14. A fuel cell system, comprising:
a fuel cell stack having an anode inlet for delivery of hydrogen to anodes of the fuel cell stack; and
at least one high-pressure hydrogen vessel in fluid communication with at least one shutoff valve, the shutoff valve in fluid communication with the anode inlet of the fuel cell stack, the at least one shutoff valve comprising a housing including a cavity and a hollow fluid flow portion, the housing having a ventilation port and a pressure control port formed therein, and a pair of fluid flow ports formed in the hollow fluid flow portion, a membrane actuator disposed in the cavity of the housing, the membrane actuator forming a substantially fluid-tight barrier that divides the cavity, a piston disposed in the cavity and the hollow fluid flow portion of the housing, the piston having a first end and a second end, the piston coupled at the first end to the membrane actuator in the cavity, and the second end having a piston head disposed in the hollow fluid flow portion, and a spring disposed in the hollow fluid flow portion of the housing, the spring biasing the piston head toward one of the fluid flow ports formed in the hollow fluid flow portion to seal the one of the fluid flow ports, wherein the sealed one of the fluid flow ports formed in the hollow fluid flow portion is opened by a pressurization of the cavity, and wherein the pressure control port of the shutoff valve is in selective fluid communication with a fluid reservoir, and at least one first electrically-controlled pneumatic valve is disposed between, and in fluid communication with, the fluid reservoir and the pressure control port of the shutoff valve, the first electrically-controlled pneumatic valve selectively controlling fluid flow to the shutoff valve for operation of the shutoff valve.

15. The fuel cell system of claim 14, further comprising at least one anode injector disposed between, and in fluid communication with, the shutoff valve and the anode inlet of the fuel cell stack.

16. The fuel cell system of claim 14, wherein a waste line is in fluid communication with the at least one first electrically-controlled pneumatic valve.

17. The fuel cell system of claim 16, wherein the waste line is in fluid communication with the anode inlet of the fuel cell stack.

* * * * *